Jan. 23, 1951 D. D. LOWBER ET AL 2,538,840
STILL PROJECTOR FOR OPAQUE
AND TRANSPARENT PROJECTION
Filed Oct. 15, 1947 3 Sheets-Sheet 2
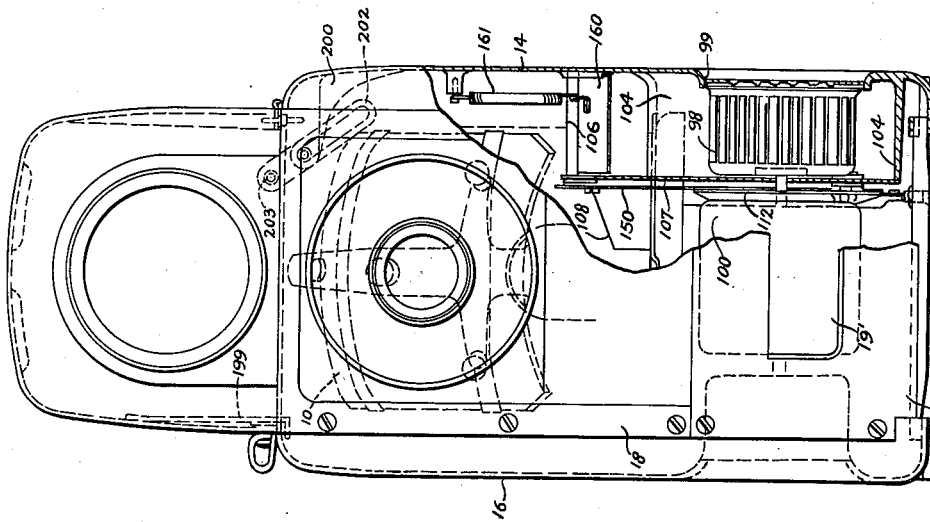
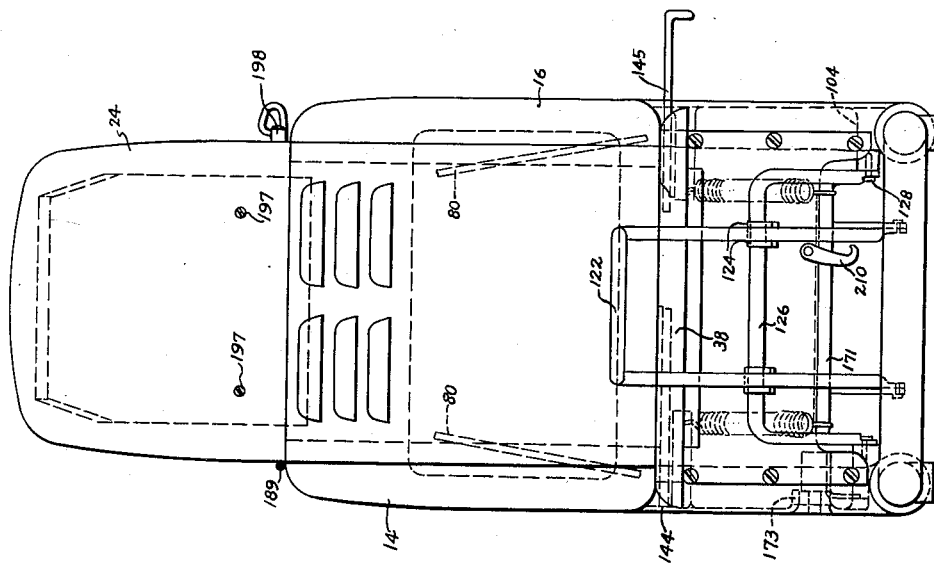
INVENTOR.
DAVID D. LOWBER
FRED H. WOLFORD
BY
ATTORNEY Jan. 23, 1951 D. D. LOWBER ET AL 2,538,840
STILL PROJECTOR FOR OPAQUE
AND TRANSPARENT PROJECTION Filed Oct. 15, 1947 3 Sheets-Sheet 3

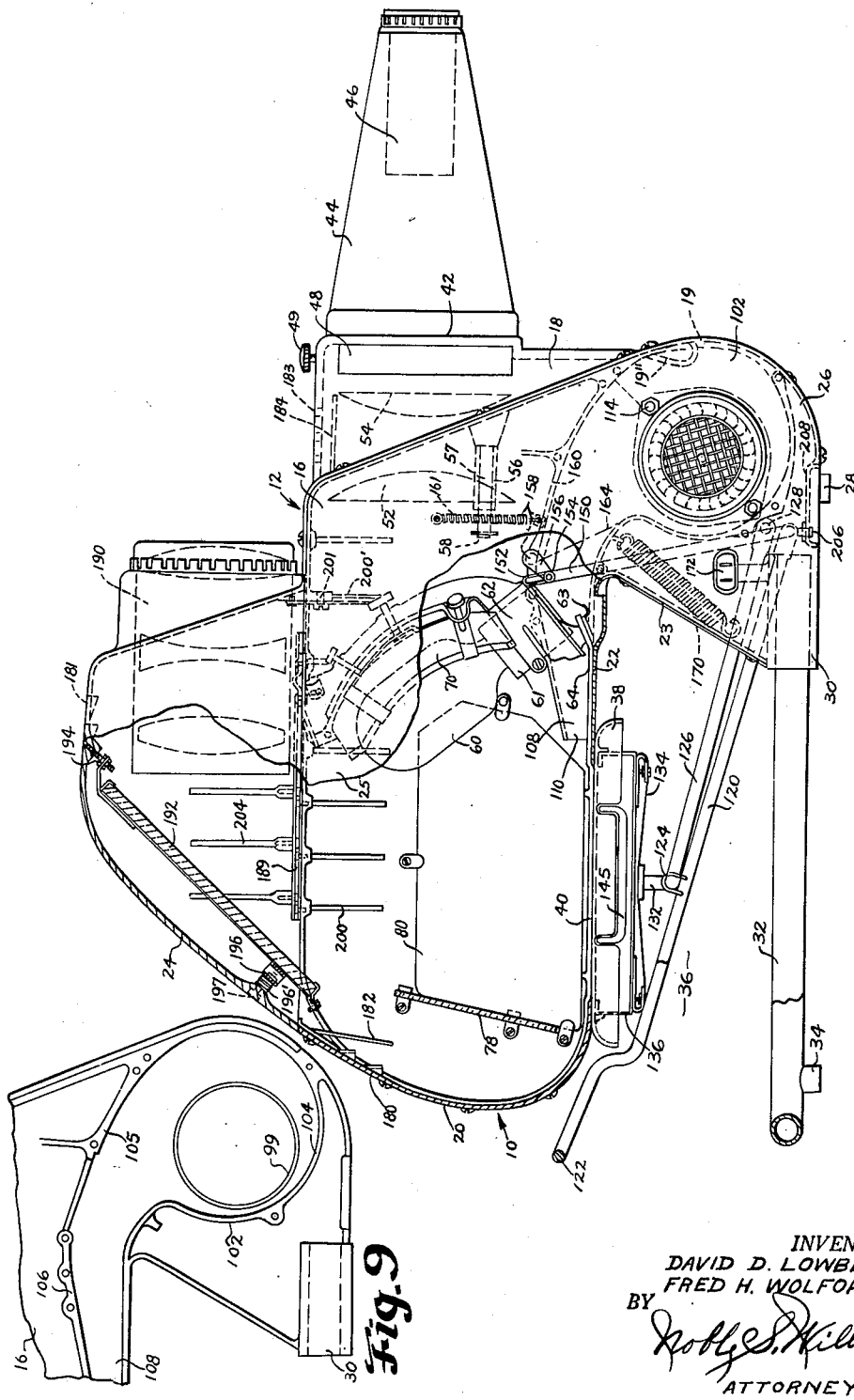

INVENTOR.
DAVID D. LOWBER
FRED H. WOLFORD
BY
ATTORNEY

Patented Jan. 23, 1951

2,538,840

UNITED STATES PATENT OFFICE 2,538,840

STILL PROJECTOR FOR OPAQUE AND TRANSPARENT PROJECTION

David D. Lowber, Ann Arbor, Mich., and Fred H. Wolford, Williamsville, N. Y., assignors to American Optical Company, Southbridge, Mass., a voluntary association of Massachusetts Application October 15, 1947, Serial No. 780,024

12 Claims. (Cl. 88—26)

This invention relates to projection devices. More particularly the invention relates to projectors of the type adapted to project images of opaque materials as well as to projectors of the type adapted to selectively project images of opaque and transparent materials.

In projectors of the present invention a horizontally disposed platen is provided for supporting material adjacent an opening in a bottom wall of the projector housing. The wall in turn is located in an elevated rearwardly extending portion of the housing so as to be in spaced relation to the supporting surface for the projector. In this manner ample room may be provided around and beneath the platen so that it may be moved downwardly and material of considerable size and thickness positioned thereon. However, since a large part of the housing is thus suspended in an over hanging arrangement and the optical system or systems for the instrument are directly carried thereby, it is important that the means for supporting the weight thereof be of a sturdy and vibration-free construction. For this reason, the projector of the present invention comprises a pair of rigid peripherally flanged, and preferably cast, side plates to which may be connected a plurality of transversely extending plates to form a rigid box-like housing. The side plates are so spaced and shaped that they form a main enclosure and a downwardly projecting bay or auxiliary enclosure near the forward end thereof and within this bay a pair of spaced blowers and an electric motor therefor may be conveniently housed. The side plates, at the lower forward portions thereof, are reinforced by integral flanges which form casings respectively for the spaced blowers. Additionally these flanges strengthen the side plates. By forming the side plates as the main load carrying members a simplified construction and assembly of the projector is provided. In the lower forward portions of the side plates are provided integral hollow lugs into which project the free ends of a U-shaped horizontal frame so as to support the rear of the housing in the elevated position previously mentioned.

Since projectors of the types described generate considerable amounts of heat during the operation thereof, it has been found essential to arrange the ventilating system so as to direct cooling air directly across the material supporting platen thereof. However, when the platen is to be opened for the insertion or removal of material, it is necessary to interrupt this flow of air and a convenient draft control mechanism for the purpose is shown and claimed in copending application Ser. No. 771,540, filed August 30, 1947, now Pat. No. 2,520,011, issued August 22, 1950. In projectors arranged for both opaque and transparent projection it is also desirable to arrange an incandescent bulb for movement between an optimum position for opaque projection and an optimum position for transparent projection. For this purpose the invention provides a manually operable mechanism arranged to move the bulb, as well as a reflector associated therewith, from a rearwardly facing inclined position to a forwardly facing substantially vertical position by a simple pivotal movement thereof.

This manually operable mechanism may additionally comprise suitable means for cooperation with parts of a draft control mechanism, such as that disclosed in said copending application, so that when the bulb is moved to a position for transparent projection the draft control mechanism would be automatically actuated into a position for continuously directing cooling air toward the transparent projection system of the instrument, and when the bulb is reversed the draft control mechanism will be automatically rendered operable for cooling the material on the platen of the instrument.

The invention also provides a rigid hollow cover member arranged to close the top of the projector housing, and to carry the lens system and reflector employed in the opaque projection system thereof. The cover is likewise preferably cast and provided with reinforcing ribs so that it will maintain its proper alignment when closed, even though it may be readily swung, when desired, about an elongated hinge secured to one lateral edge thereof to an open position. The cover is also provided with readily operable means accessible from the exterior of the cover for allowing adjustment and alignment of the reflector relative to the associated lens system and the platen opening of the instrument.

In order that large size objects, such as books and the like, may be conveniently supported by the platen at the platen opening an extension is provided at each side of the platen and arranged to slide laterally relative thereto.

Other objects and advantages of the present invention will become readily apparent from a detailed description which follows when taken in conjunction with the accompanying drawing in which:

Fig. 1 is a side elevational view, partly in section, of a projector constructed and arranged for transparent and opaque projection and embodying the present invention;

Fig. 2 is a rear elevational view of the device or instrument of Fig. 1;

Fig. 3 is a front elevational view of the device of Fig. 1, a portion thereof being broken away to better show details of construction;

Fig. 9 is a view of a portion of a side plate of the projector showing integral reinforcing means thereon.

Figure 4:
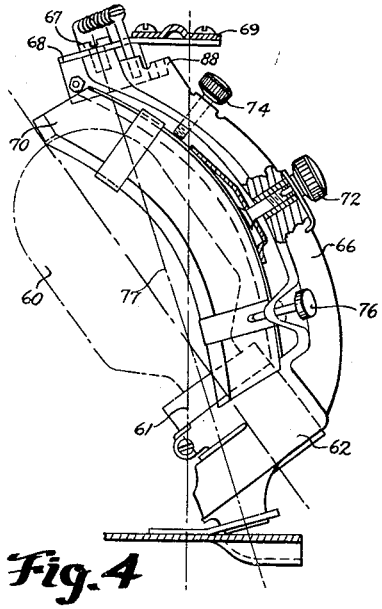
Fig. 4 is a detailed view of the reversible illuminating means of the projector.

Referring to the drawings in detail, there is shown in Fig. 1 a projector 10 adapted for transparent and opaque projection and having a housing 12 formed by a pair of rigid side plates 14 and 16, preferably formed of a die cast metal such as aluminum or zinc. These members are readily secured together in generally parallel spaced relation by a front cover plate 18, a front auxiliary plate 19, a rear curved plate 20, a floor plate 22 and a lower shielding plate 23 which are secured to the peripheral flanged edges of said side plates 14 and 16 by screws or the like to form a substantially rigid box-like main enclosure and an auxiliary enclosure projecting downwardly from the front portion thereof. A hollow cover 24 serves to close the top of the main enclosure.

Each side plate 14 and 16 comprises a main portion 25 having a horizontally disposed lower edge and a lower portion 26 projecting downwardly therefrom. The lower portion of each side plate is enlarged and arranged to support the front end of the projector upon resilient pads 28. Near the rear lower corners of each portion 26 is formed an integral sleeve 30 into which may be fitted and secured one end of a U-shaped frame member 32 which carries resilient feet 34 for supporting the rear of the projector. The U-shaped frame 32 is accordingly spaced from the lower edges of the main portions 25 of the side plates 14 and 16 to thereby provide a free or unobstructed space 36 of ample size. In this space is positioned a movable platen 38 arranged to support objects such as sheet material for opaque projection in an operative position beneath a projection opening 40 formed by the lower horizontal flanges of the main portions of side plates 14 and 16, the lower edge of the rear plate 20 and the rear edge of the floor plate 22.

The front cover plate 18 is preferably also formed as a die cast metal member which projects forwardly to provide a vertical wall 42 arranged to support a tubular extension 44 in which may be slidably positioned a tubular lens mount 46. A transverse opening 48 is provided in the cover plate 18 adjacent wall 42 and this opening is arranged to receive a slide carrier and its supporting frame which may be of any conventional construction but which is preferably of the type shown and described in copending application Serial No. 746,920, filed May 9, 1947, now Pat. No. 2,522,760, issued September 19, 1950.

The slide carrier frame may be secured in operative position by set screw 49.

Since the tubular lens mount 46 may be of a given focal length, for example 8", and interchangeable with another lens mount of a different focal length, for example 10", (depending upon the auditorium or room in which the instrument is to be used) the projector is provided with condenser lenses 52 and 54, the latter of which is supported by suitable means (not shown) in a fixed position adjacent the opening 48 and optically aligned with lens mount 46. The condenser lens 52, however, is mounted upon suitable tubular supporting means 56 arranged to be moved rearwardly of the projector upon a pair of parallel bars 57 from the position shown in Fig. 1 to a second position in engagement with stops 58 when the other of said objective is to be employed in the instrument.

Illuminating means in the form of an incandescent bulb 60 is positioned in a socket 61 which is in turn carried by a supporting base member 62. This base member 62 has a hollow pivotal connector 63 positioned in an opening in a supporting bracket 64 secured to the floor plate 22. The supporting base member 62 is provided with an integral extension frame 66 (see Fig. 4) extending upwardly from a side thereof and pivotal means 67 near its upper end is arranged to extend through an aperture in a bracket 68 centrally located on and carried by a transverse brace 69 extending transversely between the upper interior flanges on the opposite side plates 14 and 16.

The frame 66 is arranged to support a semispherical reflector 70 adjacent the bulb 60 by means of a central adjustment screw 72 which serves to move the reflector slightly toward or away from the bulb. The reflector may also be positioned to properly reflect light towards the opening 40 by means of a single upper adjusting screw 74 and a pair of laterally spaced adjusting screws 76. The socket 61, as viewed in Figs. 1 and 4, is so positioned relative to a pivotal axis 77 extending through the hollow connector 63 and through pivot means 67 that the bulb 60 supported thereby is disposed to one side of this axis and at such an angle as to give best illumination for opaque projection. The axis 77 is in turn disposed at such an angle to the vertical that, when the bulb and reflector are swung 180° about this axis, the bulb will be positioned vertically for transparent projection. An optimum bulb position for illuminating opaque material at opening 40 as well as for directing light toward a rear inclined reflector 78 and inclined side reflectors 80 has been found to be at about 52 degrees to the surface of the material at opening 40.

Figures 5, 6:
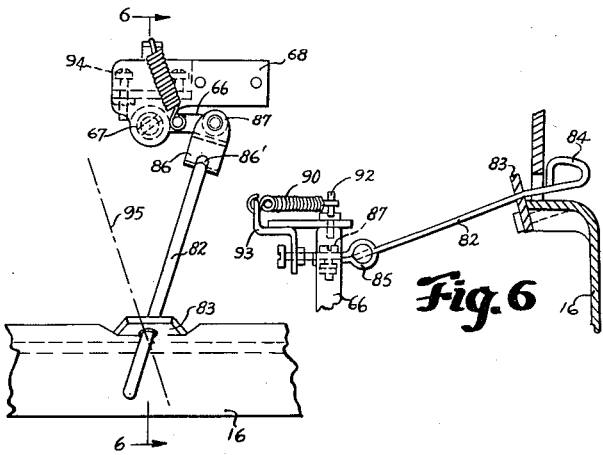
Fig. 5 is a fragmentary plan view showing one form of manually operable means for reversing said illuminating means.
Fig. 6 is a sectional view taken substantially on line 6—6 of Fig. 5 and looking in the direction of the arrows.

The bulb 60 and reflector 70 may be rotated about the axis 77 by manual means in the form of a bar 82 (see Figs. 4, 5 and 6) arranged to extend outwardly through the side of the instrument in such a way as to be guided by an apertured bracket 83 carried on the upper flange of side plate 16. A handle 84 is formed at the outer end of the bar. The inner end of this bar 82 is screw threaded or otherwise secured in a cylindrical plug 85 for pivotal movement in an encircling strap retainer 86 provided with a slot 86' for accommodating slight up and down movement of the bar 82. The retainer in turn has its opposite ends pivotally connected at 87 to a projection 88 formed near the upper end of frame member 66.

A toggle spring 90 has one end fastened to an upstanding pin 92 carried by frame 66 and its opposite end in engagement with an upstanding finger of a bent plate 93 carried by bracket 68. The finger on plate 93 is positioned at the opposite side of pivot 67 from the apertured bracket 83 so that tension of spring 90 will tend to maintain frame 66 and thus bulb, socket and reflector assembly in a forwardly facing direction for transparent projection or in a rearwardly facing direction (as indicated by Fig. 4) for opaque projection. Adjustable stops 94 are carried in longitudinally spaced relation upon a lower portion of plate 93 and serve to limit the pivotal movement of frame 66 about axis 77. By merely pulling out on handle 84 and pressing the handle on one side thereof the bulb and reflector may be easily reversed as indicated by dot-dash line 95. In this manner it may be readily positioned for transparent or opaque projection.

The forced air system previously referred to is preferably provided in the form of a pair of centrifugal blowers 98 (see Fig. 3) spaced at opposite sides of the projector and arranged so as to communicate with the outside through flanged openings 99 formed in side plates 14 and 16. A centrally located electric motor 100 is provided with a shaft upon the opposite ends of which are carried said blowers. Each blower is surrounded by a blower housing 102, best shown by Figs. 1 and 9, and each housing is formed by the vertical wall of side plate (14 or 16), flanges 104, 105 and 106 integral with the side plate and by an inner sheet metal side member 107. These parts are so shaped as to lead into a nozzle 108 at the side of the instrument. Since there is a nozzle at each side and they are shaped so as to extend rearwardly and terminate in relatively wide flat discharging exits or openings 110 they will direct the air across all parts of the platen 38 for cooling purposes. The motor 100 is provided with a flanged mounting plate 112 at each end thereof for attachment to each side member 107 of the blower housings as by clamping bolts or the like 114.

In order that the blowers 98 may operate continuously for cooling the instrument while the bulb is lighted, it is necessary to provide suitable means for controlling the air blast from the blowers each time the platen 38 is moved to an open position for the insertion or removal of sheet material or the like at the opening 40. For this purpose, there is provided a U-shaped actuating member 120 provided with a handle portion 122. This actuating member is secured by means of pairs of stirrups 124 to a second U-shaped member 126 pivotally secured at its opposite ends by pivot means 128 to the casing flanges 104.

The U-shaped member 126 carries a pair of upstanding integral arms 132, one positioned between each pair of stirrups 124, and these arms are arranged to engage and support a pair of resilient strips 134 to the opposite ends of which are secured a channel shaped sheet metal supporting member 136 adapted to receive a picture card holder (not shown) or upon which the platen 38 may be detachably supported. Strips 134 thus yieldably support the platen 38 for limited universal tilting, such as may be desirable when a book is being held against opening 40. The member 136 is made channel shaped so that it may readily slidably receive a picture card holder of conventional construction. The platen 38 may have bosses formed upon its under surface and in these bosses may be positioned a pair of U-shaped slidable frame members 144 and 145, and each frame member may be moved outwardly to an extended position to provide supporting means for large books or the like when positioned upon platen 38 for projection purposes.

To the lower free ends of the U-shaped actuating member 120 are pivotally connected actuating bars or links 150. Each link has a slotted upper end 152 for sliding engagement with a pivot 154 carried at the free end of a lever 156 and each lever 156 is carried upon a gate actuating shaft 158. (While a short shaft is provided at each side of the projector in the structure shown, it will be obvious that they could be replaced by a longer single shaft extending across the interior of the projector housing.) Each shaft 158 is mounted for pivotal movement in the flange 106 and the side plate (14 or 16) of the instrument so that rotation thereof will cause a draft control valve or gate 160, located in an aperture between flanges 105 and 106 and between member 107 and the side plate 14 or 16, to move from a normally closed position to an open position indicated by the dot-dash line 164 in Fig. 1.

Each gate 160 is normally held closed by tensioned spring 161 and is arranged to normally close the opening in the top of the blower housing 102 so that air at such times will be caused to flow through the nozzle 108 and across the platen 38. However, when the gate 160 is swung by lever 156 to the position 164, the air blast will be shut off from the nozzle 108 and forced to travel upwardly through the opening in the housing and circulate through other portions of the projector housing, as will be more fully hereinafter described.

When the projector is arranged for opaque projection, as shown in Fig. 1, and the handle 122 is moved downwardly a slight amount, the free ends of the member 120 connected to links 150 will be caused to move upwardly into engagement with flanged plates 112 and into axial alignment with the pivot means 128. This limited upward movement will cause the links 150 to swing levers 156 to move gates 160 to position 164.

After the draft through nozzles 108 has been thus shut off, further downward movement of the handle 122 against the action of a pair of strong springs 170, secured to a cross bar 171 welded to intermediate portions of the U-shaped member 126 and to suitable lugs carried by the blower housing, will cause downward movement of the U-shaped member 126, allowing platen 38 to move to its open position. Since no air will be issuing from the nozzles 108 as the platen opens, there will be no tendency for the sheet material which is to be projected to be ruffled, wrinkled or blown out of its proper position upon the platen. Obviously the draft control means and forced air system just described may be used in projector adapted only for opaque projections.

An electric plug 172 is secured adjacent a flanged opening 173 in the side plate member 16 and flexible electrical conductors (not shown) may be arranged to extend from this plug to the electric motor 100 and a similar pair of conductors arranged to extend from plug 172 upwardly through the opening, which is suitably insulated, in the pivotal connection 63 for attachment to the socket 61. In this way, a minimum of wear will be produced upon these last mentioned connectors when the lamp and reflector are pivoted about axis 77.

When the lamp 60 and reflector 70 are rotated from the inclined position shown in Fig. 1 through 180° to an upright position for transparent projection and the gate 160 is moved to dot-dash position 164, the air will be forced to flow through the opening in the blower housing 102 and upwardly about the condenser lenses and the slide carrier. Some of the air will flow by the lamp and reflector and may be expelled from the housing through rear ventilator openings 180 and openings 181 provided in the cover 24. A light shield 182 is shown in Fig. 1 adjacent openings 180. Part of the heated air may be expelled through ventilator openings 183 formed in the top of the front plate 18 and a light shield 184 may be provided adjacent these openings. Some air may pass down and out through the lower part of the housing thus cooling motor 100.

The closure or cover 24 is hingedly connected at 189 to the upper flanged edge of side member 14 and is arranged to slidably support in its front wall a projection lens system 190 for opaque projection and directly rearwardly thereof is positioned a reflector or first surface mirror 192. The reflector 192 is provided with a centrally located spring strap and an adjustable pivotal connection 194 at its upper edge and a pair of laterally spaced lower connections 196. The lower connections employ compression springs 196' and adjustable means, such as bolts 197, extending outwardly through the wall of the cover so that this reflector 192 may be easily and accurately aligned by a limited universal tilting action with the projection lens system 190 as well as with the opaque sheet material positioned upon platen 38. A plunger 198 is provided at the opposite side of the cover 24 and serves to actuate a spring catch 199 which releasably holds this cover member in closed position. (See Figs. 2 and 3).

Since the plates 14, 16, cover 24 and front plate 18 are preferably of die cast metal, it is an easy matter to form stiffening or reinforcing ribs 200 along the inner surface of plate 14 beneath the upper flanged edge thereof and immediately adjacent the location at which hinge 189 is attached. One of these ribs 200' may be formed somewhat heavier or thicker than the rest and arranged to support a restraining bolt 201 to which is slidably connected the lower slotted end of a link 202, said link having its upper end pivotally connected at 203 to the cover 24 for limiting movement of the cover beyond its fully opened position. Stiffening ribs 204 may likewise be formed on the cover 24 adjacent hinge 189.

A pair of adjustable stops 206 may be provided (see Fig. 1) in a transverse brace 208 extending between the lower flanges of the side plates 14 and 16 and these tops serve to limit the downward swinging movement of the lower ends of the U-shaped member 120 under the influence of gravity after complete closing of the gates 160 has been effected. If desired, suitable means such as a catch 210, may be provided upon the transverse plate 23 and arranged to engage a lower portion of the member 120 for holding same elevated and thus each gate 160 in its dot-dash position 164 when the projector is being used for transparent projection. The handle 122 is arranged to function with a hand hole 19', formed in the front lower plate 19 by striking out and bending inwardly the material thereof as indicated at 19", and together serve as convenient means for lifting or moving the projector.

Figure 7:
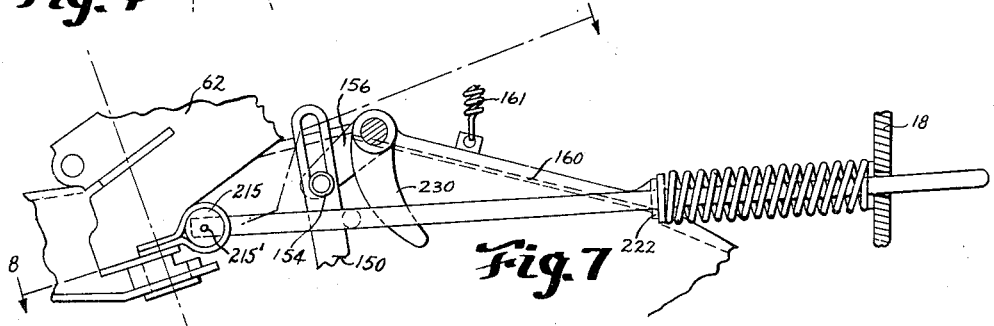
Fig. 7 is a side elevational view of a modified form of manually operable means for reversing the illuminating means.
Figure 8:
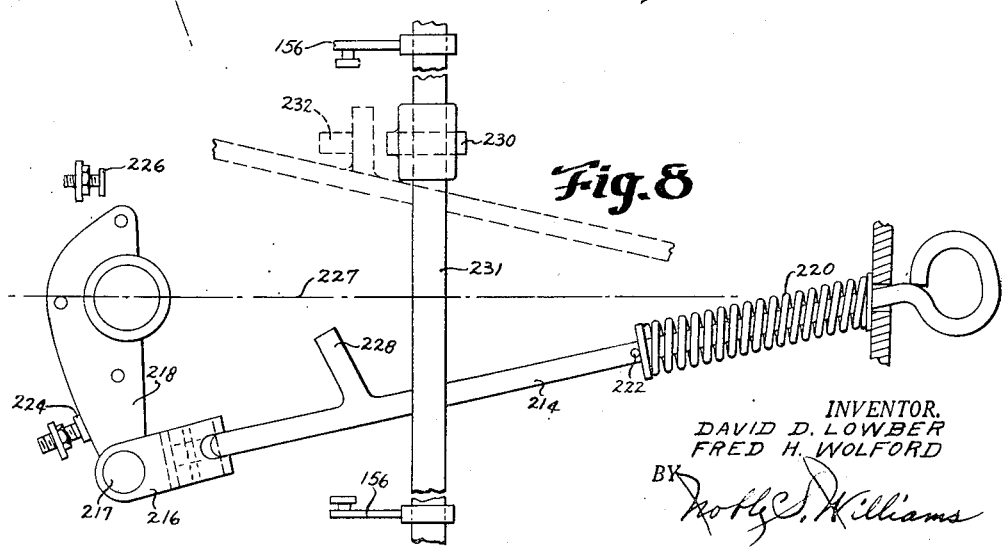
Fig. 8 is a fragmentary plan view taken substantially upon line 8—8 of Fig. 7.

A slightly modified form of bulb and reflector reversing mechanism is shown by Figs. 7 and 8 and this mechanism comprises a manually operable bar 214 arranged to extend through a central opening in the front wall 18 of the projector, instead of through the side of the projector as in the previous embodiment, and this bar 214 may be secured to a cylindrical plug 215 hingedly connected to a strap 216 in a manner similar to that previously described. A small pin 215' prevents axial rotation of the bar. The strap 216 in turn may be pivotally connected by pivot means 217 to an arm 218 secured to and extending laterally from the bottom of the supporting member 62 for the lamp 60 and the reflector 70.

A compression spring 220, confined between the front wall 18 of the projector and a pin 222 in bar 218 serves to urge arm 218 into engagement with an adjustable stop 224 when in position for opaque projection or, when reversed for transparent projection, into engagement with an adjustable stop 226. When the bar 214 is actuated by pulling it outwardly and then pressing it to one side, so that pivot 217 passes a dead center position at center line 227, the spring will then urge the bar and thus the arm 218 toward stop 226. This will cause a lateral projection 228 carried by the bar 214 to engage a cam 230 secured upon a shaft 231 and urge the lower end of the cam toward the dotted line position 232 shown in Fig. 8. In so doing, the pair of spaced levers 156 carried thereby and associated with the two draught gates 160 will be caused to swing upwardly. The pins 154 carried by the outer ends of these levers will at this time be caused to slide upwardly in the slots provided in the upper ends of links 150 and this will allow the draught control gates 160 to move against the action of the springs 161 into their lowered position. Gates 160 will thus shut off the air blast through nozzle 108 and cause all of the air from the blowers 93 to travel upwardly and about the slide carrier, condenser lenses etc. for cooling purposes during transparent projection. In this modified construction the upper pivotal connection for the bulb and reflector may be omitted if desired.

While the front plate 18 has been shown in the preferred construction of Fig. 1, it will be appreciated that this plate, together with the tubular lens support 44 and the condenser lenses 52 and 54, may be readily removed and replaced by a plain transverse front place when the device is to be used for opaque projection only.

We claim:

1. A projector of the character described comprising a pair of inwardly peripherally flanged unitary side plates and a plurality of transversely disposed plates secured to the flanges thereof to form a rigid housing having an open top, a hollow upwardly projecting rigid cover arranged to close said open top, a reinforcing flange and integral ribs along a side of said cover adjacent the lower edge thereof, reinforcing ribs along an upper portion of the adjacent side plate and arranged to strengthen the flanged edge thereof, hinge means secured to said reinforced adjacent edges for allowing said cover to be swung to an open position affording access to the interior of said housing, an opening in a lower wall of said housing, a reflector above said opening and a substantially horizontally disposed objective carried by said cover, said reflector being secured to said cover by adjustable connecting means accessible from the outside of said cover for effecting limited universal tilting of said reflector allowing optical alignment thereof with said opening and said objective.

2. A projector of the character described comprising a pair of inwardly peripherally flanged unitary side plates and a plurality of transversely disposed plates secured to the flanges thereof to form a rigid housing having an open top, a hollow upwardly projecting unitary rigid cover arranged to close said open top, an integral flange and reinforcing ribs along a side of said cover adjacent the lower edge thereof and projecting inwardly, reinforcing ribs along an inner upper portion of the adjacent side plate and arranged to strengthen the flanged edge thereof, hinge means secured to said reinforced adjacent flanged edges for allowing said cover to be swung in a lateral direction to an open position affording access to the interior of said housing, an opening in a lower wall of said housing, flanged forward portions of said side plates extending downwardly below the plane of said lower wall, a rearwardly projecting frame secured to said flanged forward portions for sustaining said lower wall in an elevated position, a reflector above said opening and a substantially horizontally disposed objective carried by said cover, and means for securing said reflector to said cover for optical alignment with said opening and said objective when said cover is closed, said securing means comprising a pivotal connection adjacent an edge portion of said reflector and manually adjustable means adjacent an opposite edge portion thereof and adjustable from the exterior of said cover for allowing limited universal tilting movement of said reflector.

3. A projector of the character described comprising a pair of spaced inwardly peripherally flanged unitary rigid side plates and a plurality of transversely extending plates secured to the flanges thereof so as to form a rigid housing having an opening in an upper wall thereof, a movable hollow upwardly projecting cover arranged to normally close said opening, a substantially horizontally disposed objective carried by said cover, said housing having a second opening in a lower wall thereof, a platen normally closing said second opening and arranged to support material adjacent thereto for opaque projection, said rigid side plates having front portions thereof extending downwardly below the plane of the second opening for forming front supporting means for the projector, a frame for supporting the rear part of said housing so as to position said second opening in elevated relation to the projector supporting surface, said frame being rigidly connected to the lower portions of said side plates and the peripheral flanges thereon, air inlet openings in said lower portions of said side plates, integral inwardly projecting flanges surrounding each of said inlet openings, a reflector within said cover for reflecting light from material at said second opening toward said objective, and connecting means secured to said reflector and to said cover and extending through said cover so as to be adjustable from the exterior thereof for effecting limited universal adjustment of said reflector for optically aligning said second opening with said objective.

4. A projector of the character described comprising a pair of unitary spaced rigid side plates having inwardly extending peripheral flanges formed integrally therewith, a plurality of transversely extending plates secured to said flanges so as to form with said side plates a rigid housing, means for closing the open top of said housing, a substantially horizontally disposed objective and a reflector supported adjacent the upper part of said housing, said housing being of such a shape as to provide a main enclosure and a relatively smaller auxiliary enclosure projecting downwardly therefrom, a platen opening in a lower wall of said main enclosure and located beneath said reflector, a platen normally closing said opening, a pair of blowers and an electric motor transversely disposed in said auxiliary enclosure, said motor being located between said blowers with the opposite ends of the drive shaft thereof arranged to actuate said blowers, flange means integral with each side plate and arranged in such a manner as to form with portions of said peripheral flanges casing means for each blower, each casing means being shaped so as to direct cooling air from the associated blower toward the platen opening, and a rigid frame member secured to a lower portion of each side plate and extending rearwardly therefrom as supporting means for the rear portion of said projector.

5. A projector of the character described comprising a rigid box-like housing, a substantially horizontally disposed objective and an angularly disposed reflector carried by an upper part of said housing, said housing having a horizontally disposed lower wall arranged in elevated relation to the supporting surface for the projector, an opening in said lower wall beneath said reflector, a material supporting platen of such size as to be completely contained within the lateral limits of said housing and beneath said opening, and arranged to substantially completely close said opening, means for resiliently urging said platen toward said opening, readily operable means for moving said platen downwardly relative thereto for the removal of or insertion of material between said platen and bottom wall, and a laterally shiftable frame member carried by said platen, said member being arranged to be substantially completely contained beneath said platen when in a retracted position and also arranged to be moved outwardly from its retracted position to a position disposed appreciably outwardly of the side of said housing so as to form an additional material supporting surface which is approximately in the same plane as the material supporting surface of said platen.

6. A projector of the character described comprising a housing, a substantially horizontally disposed opening in a wall of said housing, a platen for holding material adjacent said opening for opaque projection, a reflector and a substantially horizontally disposed objective carried by said housing, a second substantially horizontally disposed objective carried by said housing, a second opening in said housing for the insertion of a lantern slide or the like into optical alignment with said second objective, an assembly including a socket for supporting an incandescent bulb and a second reflector associated therewith, means for mounting said assembly for rotation in said housing about an axis disposed at such an angle to the longitudinal axis of the bulb and socket that said bulb, socket and second reflector may be swung about said first axis into an inclined position for illuminating material at said first opening or into an upright position for illuminating a slide at said second opening, means for directing cooling air into said housing, a valve normally directing the air toward said first opening, and operable means for moving said assembly into either said inclined or said upright position, and for moving said valve so as to direct at least part of said air toward said second opening when moved to upright position, said last mentioned means comprising an arm rigidly connected to said assembly and an actuating member pivotally connected thereto and arranged to swing through a dead center position for urging said assembly toward said inclined position or said upright position, and spring means connected to said operable means for urging said assembly to one or the other of said positions.

7. A projector of the character described and comprising a housing, a substantially horizontally disposed opening in a lower wall of said housing, a platen for holding material adjacent said opening for opaque projection, a reflector and a substantially horizontally disposed objective above said opening and optically aligned therewith, a second substantially horizontally disposed objective carried by said housing, a second opening in said housing for the insertion of a lantern slide or the like into optical alignment with said second objective, a socket in said housing arranged to support an incandescent bulb for movement into a first position for illuminating sheet material at said first opening or into a second position for illuminating a slide at said second opening, a blower in said housing, a valve associated with said blower and arranged for movement into a first position for causing cooling air from said blower to flow toward said first opening and into a second position for causing cooling air to flow toward said second opening, means for normally holding said valve in its first position, manual means for moving said socket and bulb from their first position to their second position and for simultaneously moving said valve from its first position to its second position.

8. A projector of the character described comprising a housing, a substantially horizontally disposed opening in a lower wall of said housing, a platen for holding material adjacent said opening for opaque projection, a reflector and a substantially horizontally disposed objective above said opening and optically aligned therewith, a second substantially horizontally disposed objective carried by said housing, means for supporting a lantern slide or the like in optical alignment with said second objective, a socket in said housing arranged to support an incandescent bulb for movement therein, a second reflector associated therewith, manual means for selectively moving said bulb, socket and second reflector into an inclined position for illuminating said material or into an upright position for illuminating said slide, a blower for blowing cooling air toward said opening, a valve associated with said blower and arranged for movement into a first position for causing cooling air from said blower to flow toward said opening and into a second position for preventing cooling air from blowing toward said opening and causing it to flow into the part of the housing containing the slide supporting means, means for normally urging said valve into said first position, operator actuated means arranged during movement to a predetermined position to first move said valve to its second position and then move said platen away from said opening, and an element arranged during movement of said bulb, socket and second reflector into said upright position to positively move said valve into its second position, if said valve is not already in said second position.

9. A projector of the character described comprising a housing, a substantially horizontally disposed opening in a lower wall of said housing, a platen for holding material adjacent said opening for opaque projection, a reflector and a substantially horizontally disposed objective above said opening and optically aligned therewith, a second substantially horizontally disposed objective carried by said housing, means for supporting lantern slides or the like in optical alignment with said second objective, a socket in said housing for supporting an incandescent bulb, a second reflector associated with said socket, means for mounting said bulb, socket and second reflector for rotation in said housing about an axis disposed at such an angle to the longitudinal axis of said bulb and socket that said bulb, socket and second reflector may be readily swung about said first axis into an inclined position for illuminating material at said opening or into an upright position for illuminating a slide aligned with said second objective, a blower in said housing, a valve associated with said blower and arranged for movement into a first position for causing cooling air from said blower to flow toward said opening and into a second position for causing cooling air to flow toward said slide, and manually operable means for swinging said bulb, socket and second reflector from their inclined position to their upright position and for simultaneously moving said valve from its first position to its second position.

10. A projector of the character described comprising a housing, a substantially horizontally disposed opening in a lower wall of said housing, a platen for holding material adjacent said opening for opaque projection, a reflector and a substantially horizontally disposed objective above said opening and optically aligned therewith, a second substantially horizontally disposed objective carried by said housing, means for supporting a lantern slide or the like in optical alignment with said second objective, a socket for supporting an incandescent bulb, a second reflector associated with said socket, means mounting said bulb, socket and second reflector for pivotal movement in said housing, manual means for selectively pivoting said bulb, socket and second reflector into an inclined position for illuminating said material or into an upright position for illuminating said slide, a blower for blowing cooling air toward said opening, a valve associated with said blower and arranged for movement into a first position for causing cooling air from said blower to flow toward said opening and into a second position for preventing cooling air from blowing toward said opening and causing it to flow toward the part of the housing arranged to receive said slide, yieldable supporting means including a lever for normally urging said platen toward said opening, an operator actuated lever pivotally connected to said first lever and operatively connected to said valve, said operator actuated lever being arranged during movement to a predetermined position to first move said valve to its second position and then cause said first lever to move said platen away from said opening, and an element associated with said manual means and arranged to positively move said valve to its second position when said bulb, socket and second reflector are rotated into said upright position if said valve is not already in said second position.

11. A projector of the character described comprising a pair of spaced rigid unitary side plates each having an inwardly extending substantially endless peripheral flange formed integrally therewith, a plurality of transversely extending plates secured to said flanges so as to form with said side plates a rigid housing arranged to provide a main and a relatively smaller auxiliary enclosure, means for closing the top of said main enclosure, a substantially horizontally disposed objective and a reflector supported by the portion of said housing forming said main enclosure, said housing being of such a shape that said auxiliary enclosure projects downwardly from the forward portion of said main enclosure, an opening in a lower wall of said main enclosure and located beneath said reflector, a platen normally closing said opening, and a rigid relatively flat frame member secured to the lower flanged portions of said side plates and extending rearwardly therefrom, said side plates and said rigid frame member serving as the front and rear supporting means respectively for said projector.

12. A projector of the character described comprising a pair of spaced rigid side plates each having an inwardly extending substantially endless peripheral flange formed integrally therewith, a plurality of transversely extending plates secured to said flanges so as to form with said side plates a rigid housing arranged to provide a main enclosure and an auxiliary enclosure, means for closing the top of said main enclosure, a substantially horizontally disposed objective and a reflector supported by the portion of said housing forming said main enclosure, said housing being of such a shape that said auxiliary enclosure projects downwardly from the forward portion of said main enclosure, an opening in a lower wall of said main enclosure and located beneath said reflector, a platen normally closing said opening, a pair of blowers in said auxiliary enclosure, flange means integral with each side plate and surrounding each blower in such a manner as to form a partial enclosure therefor, each casing being arranged to direct air from a blower toward said opening, an aperture in each blower casing, a valve for closing each aperture, operator controllable means for moving each valve from a position closing said aperture to a position reducing the flow of air toward said opening and causing at least part of the air to flow through said aperture, and a rigid relatively flat frame member secured to lower portions of said side plates and peripheral flanges and extending rearwardly therefrom, said side plates and said rigid frame member serving as the front and rear supporting means respectively for said projector.

DAVID D. LOWBER.
FRED H. WOLFORD.

REFERENCES CITED

The following references are of record in the file of this patent:

UNITED STATES PATENTS

| Number | Name | Date |
| --- | --- | --- |
| 1,076,077 | Thompson | Oct. 21, 1913 |
| 1,341,665 | Ott et al. | June 1, 1920 |
| 1,580,969 | Dina | Apr. 13, 1926 |
| 1,708,987 | Wager | Apr. 16, 1929 |
| 1,921,214 | Carpenter | Aug. 8, 1933 |
| 1,966,531 | Tint | July 17, 1934 |
| 2,200,637 | Perkins et al. | May 14, 1940 |
| 2,230,573 | Mestre | Feb. 4, 1941 |
| 2,273,936 | Ceroni | Feb. 24, 1942 |
| 2,332,691 | Blaisdell | Oct. 26, 1943 |
| 2,344,263 | Perkins | Mar. 14, 1944 |
| 2,395,561 | Osterberg et al. | Feb. 26, 1946 |

FOREIGN PATENTS

| Number | Country | Date |
| --- | --- | --- |
| 474,891 | Germany | Apr. 13, 1929 |